United States Patent [19]

Sano et al.

[11] 3,951,905

[45] Apr. 20, 1976

[54] FIBER- AND FILM-FORMING POLYESTER COMPOSITION

[75] Inventors: Keizo Sano; Yoshimasa Nishida, both of Mishima; Yoshio Kagiya, Shizuoka; Michihiko Tanaka, Aichi; Masatoshi Mineo, Mishima, all of Japan

[73] Assignee: Toray Industries, Inc., Tokyo, Japan

[22] Filed: Apr. 30, 1974

[21] Appl. No.: 465,533

[30] Foreign Application Priority Data

May 10, 1973 Japan............................. 48-51123

[52] U.S. Cl............................. 260/40 R; 260/40 P; 260/75 R; 260/75 P; 260/DIG. 35
[51] Int. Cl.² ................... C08G 63/34; C08G 63/70
[58] Field of Search.......... 106/303; 260/40 P, 75 P, 260/75 R, DIG. 35, 40 R

[56] References Cited
UNITED STATES PATENTS

| | | | |
|---|---|---|---|
| 2,921,051 | 1/1960 | Amboski et al. | 260/75 P |
| 3,028,366 | 4/1962 | Engle et al. | 260/75 P |
| 3,171,828 | 3/1965 | Isaacs et al. | 260/75 P |
| 3,441,540 | 4/1969 | Müller et al. | 260/75 P |
| 3,536,667 | 10/1970 | Stewart et al. | 260/75 R |
| 3,803,097 | 4/1974 | Lazarus et al. | 260/75 R |
| 3,822,239 | 7/1974 | Chimura et al. | 260/75 R |
| 3,830,775 | 8/1974 | Hewertson | 260/75 R X |
| 3,844,976 | 10/1974 | Ventura et al. | 260/75 R X |

*Primary Examiner*—Donald E. Czaja
*Assistant Examiner*—S. M. Person

[57] ABSTRACT

Fiber- and film-forming composition comprising a linear synthetic polyester together with antimony-containing particles, present in an amount of from 0.02 to 1.0% by weight of the composition. The content of elemental antimony in the antimony-containing particles is from 15 to 70% of the weight of the particles.

23 Claims, 4 Drawing Figures

FIBER- AND FILM-FORMING POLYESTER COMPOSITION

GENERAL FIELD OF THE INVENTION

The present invention relates to a fiber- and film-forming polyester composition having excellent transparency and slipperiness which is readily shapable to form fibers and films, for example.

DISCUSSION OF THE PRIOR ART

In general polyesters, especially polyethylene terephthalate, have been widely used as fibers for clothing. They have also been popular for industrial uses and as films for magnetic tape and for photography, for example, due to their excellent mechanical properties and to their chemical characteristics as well.

However, when it is desired to make polyester products that have optimum brilliancy and transparency, for example, polyester fibers having non-circular cross-sectional configurations, or films for phototgraphy or for use as wrapping materials, poor productivity characteristics are frequently encountered in processing steps such as shaping, melt spinning, drawing, texturizing, knitting, weaving, etc. of the polyesters, especially when the polyester is polyethylene terephthalate.

Further, when for reasons of simplicity and cost the spinning speed is increased in a manner to produce an oriented undrawn yarn having a birefringence value of $13 \times 10^{-3}$ to $80 \times 10^{-3}$, poor productivity has been a serious problem. The reasons, in many cases, include such factors as high friction coefficient or excessively low friction coefficient between yarn and yarn, film and film, yarn and metal and film and metal, unstable fluidity at the time of melt shaping, and unstable thermal deformation at temperatures above the glass transition point but lower than the melting point.

In order to overcome these difficulties, many technologies have heretofore been proposed and practiced. They might be classified roughly as follows:

1. Adding fine particles which are inert to the polyester synthesis reaction system. Such particles include titanium dioxide, talc, kaolinite and calcium carbonate. This procedure is hereinafter referred to as the "particle addition" method.
2. Separating all or part of the catalyst or the coloration preventing agent, etc. which is used when the polyester is synthesized in the reaction process, and causing them to be present in the form of fine particles. This is hereinafter referred to as the "particle formation" method.

However, problems arise in the use of the particle addition method. When fine particles such as titanium dioxide are used, which have strong hiding power, they present problems in the case of fibers which are required to have transparency. This is especially evident in fibers having noncircular cross-sections, in highly oriented undrawn yarns having a birefringence value of $13 \times 10^{-3}$ to $80 \times 10^{-3}$ obtained by taking up the yarn at high speeds, and in various films. In those cases it is difficult to provide the fine particles in a sufficient amount to provide sufficient productivity, without sacrificing transparency. However, when one uses talc, kaolinite or calcium carbonate, their hiding powers are relatively weak, and the problem of controlling the upper limit of the amount to be added without sacrificing transparency is considerably deemphasized. However, there are other drawbacks, such as the fact that coarse particles tend to develop and to be present in the admixture, for example. This happens because the added particles lack affinity for the polyester and tend to cohere in the course of the polyester production process. Also, such coarse particles tend to detach themselves from the product after it has been formed from the polyester composition.

On the other hand, in the particle formation method, the difficulties of the particle addition method are improved upon considerably. However, when the merits and demerits of the method are stated, when considering the use of a calcium compound which is a typical example, various factors apply.

When the calcium compound once dissolves in the polyester reaction system, or in a material such as a glycol or the like, for synthesizing the polyester, and depending upon the condition of the system to which it is added, the calcium compound may separate immediately from its solvent within the system, or may separate gradually within the system as the condition of the system changes. Therefore, the particles obtained are relatively uniform and small, and the affinity of the resulting particles for the polyester substrate is sufficient. However, there is considerable coherent strength among the particles. Accordingly, coarse particles or aggregates are produced in the admixture and tend to cause clogging of filters, breakage of individual filaments and breakage of films. Further, when the fiber is subjected to high speed winding at the time of melt spinning and drawing of the fiber, the shape of the resulting package is poor because the coefficient of friction from yarn to yarn is too low. This is considered to be due to the existence of coarse particles on the surface of the yarn. The greatest drawback encountered when calcium compounds and the like are used is that a substance having about the same composition as that of the resulting particles adheres to the wall of the heat transmitting surface of the polyester synthesizing apparatus, which substance falls off and mixes as a foreign substance in the polyester itself. This then tends to cause clogging of filters, breakage of individual filaments and breakage of films.

We have conducted strenuous studies to overcome the aforementioned drawbacks of the prior art, especially the fact that it has heretofore been impossible adequately to improve upon various production problems while still maintaining transparency, and also the fact that it has heretofore been impossible to eliminate the problems due to the presence of an adhered substance in the steps of synthesizing the polyester.

OBJECTS OF THE INVENTION

An object of the present invention is to provide a polyester composition having excellent transparency, which is ideally adapted for ease of productivity in forming fibers and/or films, and which is easy to synthesize.

Another object of the present invention is to provide a polyester composition which is easy to produce, and which may be made into an oriented undrawn polyester yarn having a birefringence value of $13 \times 10^{-3}$–$80 \times 10^{-3}$ which has excellent handling properties and which in turn can be made into a drawn yarn or into a bulky processed yarn having excellent properties.

BRIEF DESCRIPTION OF THE INVENTION

The foregoing and other objects of the present invention are achieved by providing a fiber- and film-forming composition comprising a linear synthetic polyester together with particles containing antimony, such particles being present in an amount of from about 0.02 to 1.0% by weight of said composition. The content of elemental antimony in the antimony-containing particles is from about 15 to 70% of the weight of the particles.

In accordance with the present invention, it is necessary that the antimony-containing particles be present in an amount of about 0.02–1.0% by weight of the total polyester composition, preferably about 0.05–0.5% by weight of the total composition.

When the antimony-containing particles are present in an amount less than about 0.02% by weight, it has been discovered after preparing fibers and films from the resulting polyester, that the friction coefficients from yarn to yarn, from film to film, from yarn to metal and from film to metal are too high. Therefore, sufficient fluidity stability cannot be secured at the time of melt-shaping. Further, the thermal deformation at a temperature higher than the glass transition point, but lower than the melting point, is insufficient.

On the other hand, when the amount of antimony-containing particles exceeds about 1.0%, and the resulting polyester is formed into fiber or film, the transparency of the product is impaired and the particles adversely affect production by clogging filters in the melt-shaping process, and cause breakage of the fiber or the film.

Further, it is necessary that the particles separated in the quantitative measuring process should contain about 15–75% by weight (based on the weight of the particles) of elemental antimony, preferably 30–60% by weight. When the antimony content in the particles is outside said range, the fine diffusion of the particles due to the particle components inherent in the present invention cannot be developed.

It is permissible that another metallic element, such as the alkaline earth metals such as calcium, strontium or barium, or alkali metals such as lithium, sodium, or potassium, or other metals such as manganese, cobalt or zinc may be present along with the metallic antimony.

It is preferable that the particles containing antimony which are present in the polyester composition of the present invention have an average particle size (observed by a method of observation to be mentioned later) less than 10 microns and substantially free of course particles having a greater particle diameter of 30 microns. Particles having an average particle diameter less than 5 microns and substantially free of coarse particles having a particle diameter of more than 20 microns, are especially preferable. Further, it is preferable that the polyester composition of the present invention have a solution haze (measured by a method to be mentioned later) of about 5–70%, more preferably 20–65%.

When the particles having a coarse diameter of more than about 30 microns exist, even in the case of the composition of the present invention, there is a danger that it will adversely affect clogging of a filter during the melt-shaping process forming it into fibers or film, and that it will cause breakage of fiber or breakage of film. And, when the solution haze value is less than about 5%, the particles are too superfine, there is a danger that this will bring about deterioration of various friction characteristics. Also, because the particles tend to mix to form an ultra-course foreign substance, this also exerts an adverse influence. And when the solution haze exceeds about 70%, it is not possible to develop the necessary transparency.

In order to obtain a polyester composition containing particles of the present invention, it is desirable to form particles within the reaction system by adding an antimony compound and an inorganic acid (and/or a derivative thereof) to a polyester during the process of making the polyester. It has heretofore been known to add a catalytic amount of antimony and a small amount of an inorgaic acid and/or a derivative thereof to the reaction system at the time of synthesizing the polyester. However, formation of particles of this composition, in such amounts in the polyester, under the following conditions and using the following procedures has never been known, so far as we are aware.

Usually a polyester is synthesized by two reaction stages. In the first stage reaction a diglycolester of a dicarboxylic acid or a low polymer thereof is obtained from a dicarboxylic acid or a lower alkyl ester thereof, and in the subsequent second stage reaction a polyester is obtained by removing glycol. In order to obtain a polyester composition containing particles according to the present invention, one or more antimony compounds and one or more inorganic acid and/or derivatives thereof are added to the reaction system at a time when the first stage reaction is almost completed and before the subsequent second stage reaction has proceeded to a great extent. In this case, it is preferably to add the antimony compound and the inorganic acid and/or derivative thereof simultaneously through different inlets, or to add the inorganic acid and/or derivative thereof through the same or different inlets within 10 minutes at the latest, after the antimony compound has been added.

It is preferable to add the antimony compound and the inorganic acid and/or derivative thereof as a glycol solution, or as a glycol slurry.

When the antimony compound and the inorganic acid and/or derivative thereof are added successively to the reaction system, with a long interval between additions, it is frequently not possible to form the necessary amount of particles, especially when the inorganic acid and/or derivative thereof is added prior to addition of the antimony compound. When the antimony compound is simply mixed with the inorganic acid and/or derivative thereof before they are added to the reaction system, the formed particles tend to become coarse.

Referring to the condition of the reaction system when the antimony compound and the inorganic acid and/or derivative thereof are added, it is preferable that some amount of a free acid component should exist in the system. Unless there is a free acid component, the required amount of particles is frequently not obtained. There are various methods of causing a free acid component to exist, and when a polyester is synthesized from a lower alkyl ester of a dicarboxylic acid and glycol, it is possible to add an organic acid component such as terephthalic acid, isophthalic acid or a monoalkyl ester thereof, or a monoglycol ester thereof, or acetic acid or propionic acid to the reaction system within about 10 minutes before or after the antimony compound is added. When the polyester is synthesized by the reaction of a dicarboxylic acid with an alkylene oxide, or by direct esterification of a dicarboxylic acid with glycol, the antimony compound may be added to the reaction system before and without completing the first stage reaction, but leaving behind an acid residue to some extent. Also, the concept of increasing the amount of the inorganic acid and/or derivative thereof to be added, and maintaining acidity in the reaction system, may be adopted.

According to a preferred method, at the time the polyester is synthesized from a lower alkyl ester of a dicarboxylic acid and a glycol, the amount of inorganic acid and/or derivative to be added is increased in order to maintain acidity in the reaction system. In this case, it is preferred to add the inorganic acid and/or derivative thereof in an amount of about 1.5–3.0 equivalents based on the antimony. When the amount added is less than 1.5 equivalents, either the necessary quantity of particles is not obtained, or the polyester blackens. When the amount added exceeds about 3.0 equivalents, the reactivity of the polymerization reaction is seriously impaired, which is not desirable. When an organic acid is added to make the reaction system maintain its acidity, it is preferable to add the inorganic acid and/or derivative thereof in an amount of about 0.5–2.0 equivalents based on the antimony.

When the polyester is synthesized from a dicarboxylic acid and glycol, the addition of an antimony compound and an inorganic acid and/or derivative thereof of the reaction system which is in a first stage of incomplete esterification reaction, but leaving behind an acid residue to some extent, is preferable.

Conversion of the first stage esterification reaction at the time of adding the antimony compound and the inorganic acid and/or derivative thereof is 85–95%, and it is recommended to add the inorganic acid and/or derivative thereof in an amount of about 0.5–2.0 equivalents based on the antimony. When the conversion of the esterification reaction exceeds 95%, or the added amount of inorganic acid and/or derivative thereof is less than 0.5 equivalent based on the antimony, either the necessary amount of particles is not obtained or (even if such amount is obtained) the polyester blackens. When the conversion of the esterification reaction is less than 85% or the added amount of the inorganic acid and/or derivative thereof exceeds two equivalents based on the antimony, the reactivity of the polymerization reaction is seriously impaired.

It is possible to vary the amount of particles produced by changing the amount of antimony compound to be added. In order to obtain a polyester composition of the present invention, the antimony compound should be added in an amount of about 0.03–0.6% (based on the polyester) expressed as elemental antimony. Preferably, said amount should be about 0.05–0.2% (based on the polyester) expressed as elemental antimony. When a small amount of antimony is used, in the range used as a polymerization catalyst in general, the necessary amount of particles is not obtained. Addition of an excessive amount of the antimony compound is not desirable because it tends to impair the thermal and mechanical performance of the polyester. Specifically, it is preferable to provide a necessary and sufficient ratio of the particle component which is about 0.02–1.0% by weight (based on the polyester.) This relatively small amount of antimony compound is provided by adopting various methods for producing the polyester composition which contains particles according to the present invention.

As antimony compounds usable in the present invention, metallic antimony, oxides such as antimony trioxide and antimony pentoxide, antimony salts of acids such as antimony acetate, antimonic acid esters such as antimony glycolate and antimony alkoxide and organic antimony compounds may be used. However, antimony oxide, antimony salts of acids and antimonic acid esters are most preferably used.

As the inorganic acid and/or derivative thereof used in the present invention, acids such as sulfuric acid, nitric acid, phosphoric acid and phosphorus acid and their esters and salts (including their partial esters and partial salts) may be cited. Phosphorus compounds are preferable, especially phosphoric acid which is most preferably used.

It is difficult to define specifically the composition of the particles obtained by the present invention; however, the main component of said particles is an antimony salt of the inorganic acid and/or derivative thereof used. Specifically, when phosphoric acid is used as such inorganic acid, a main component of the particles is antimony phosphate.

Upon obtaining a polyester composition of the present invention, there is no objection at all to the use of a hitherto known ester interchange catalyst and a hitherto known polycondensation catalyst. And it is of course possible to keep a part of the antimony compound active and use such part of the antimony compound as a catalyst for the polycondensation reaction. This method is most preferable.

However, when a known catalyst (for example, a compound of Li, Na, K, Ca, Sr, Ba, Mg, Zn, Mn, Co, Ge, Pb or Sn) forms other particles, which are separated by the method of measuring the amount of the particles of the present invention to be mentioned later, and the amount of antimony contained in all particles becomes less than about 15% by weight, the particles in the polyester composition become coarse. Therefore, the excellent effects achieved by the present invention are not developed.

Upon producing a polyester of the present invention by an ester interchange reaction, it is preferable to use, as the catalyst for the ester interchange reaction, a catalyst which does not form coarse particles per se, for example Mn, Mg and Co compounds.

As a fiber- and film-forming, saturated, linear polyester of the present invention, almost any polyester suffices. Typical examples include polyethylene terephthalate, polyethylene-2,6-naphthalene dicarboxylate, poly-1,4-cyclohexylene dimethylene terephthalate, polyutylene terephthalate, polyethylene p,p′ diphenoxyethane dicarboxylate and polyethylene-P-oxybenzoate.

These polyesters may be copolymerized with other dicarboxylic acid components, glycol components or oxycarboxylic acid components in an amount not exeeding 20 mole % of the constitutional components of the polyesters, and they may be copolymerized with components having an at least trifunctional group in an amount not exceeding 10 mole % of these constitutional components. Further, a monofunctional component may be present in these polyesters in an amount not exceeding about 5 mole %.

As specific examples of these copolymerizable components, there are the following compounds. Regarding the dicarboxylic acid component, mention should be made of adipic acid, sebacic acid, phthalic acid, isophthalic acid, terephthalic acid, 2,6-naphthalene dicarboxylic acid, p,p' diphenoxyethane dicarboxylic acid, 5-sodium sulfoisophthalic acid and 4,4-benzophenone dicarboxylic acid. As diol components, there are ethylene glycol, diethylene glycol, propylene glycol, 1,4-butanediol, neopentyl glycol, polyethylene glycol, xylyene glycol, 1,4-cyclohexane dimethanol and 5-sodium sulforesorcinol. As oxycarboxylic acid components, there are p-oxyethoxy benzoic acid, etc. As components having an at least trivalent functional group, there are trimellitic acid and pyromellitic acid. As monofunctional components, there are sodium m-phenol sulfonate, etc.

In the polyester composition of the present invention, additives such as titanium dioxide, talc and kaolinite may be used, and various quality-improving agents such as flame retardants, coloration preventing agents, anti-static agents, heat resisting agents and light resisting agents may be provided within appropriate ranges provided they do not interfere with the requirements of the present invention. Further the polyester composition may contain surface treating agents such as various oiling agents, dyestuffs or fluorescent or bleaching agents in amounts within compatible ranges and not exceeding about 10% by weight of the composition.

Using a polyester-antimony composition of the present invention, fibers and films having high quality, which none has been able to achieve in the prior art, can now be obtained at a high rate of productivity.

Fibers obtained from the polyester composition of the present invention have characteristics wherein (1) the amount of particles is about 0.02–1.0% by weight, preferably 0.05–0.5% by weight, (2) the average particle diameter of the particles is less than about 10 microns, preferably less than about 5 microns, with the composition substantially free of coarse particles having a particle diameter of 30 microns or above, preferably 20 microns or above, (3) the solution haze is about 5–70%, preferably about 20–60%, (4) the coefficient of interyarn friction is about 0.32–0.50, preferably about 0.35–0.45, and (5) the friction coefficient between yarn and metal is about 0.45–0.80, preferably about 0.45–0.70. Such friction characteristics are characterized by a relatively large coefficient of interyarn friction, making it unlikely that the yarn will crumble when it is wound up or taken off a package. Such characteristics are especially important in the production of a highly oriented undrawn yarn having a birefringence value of about $13 \times 10^{-3}$ to $80 \times 10^{-3}$ with the use of high speed spinning. The fact that the friction coefficient between yarn and metal is relatively low indicates that, upon subjecting the yarn to various processing conditions, the frictional forces between the yarn and the guides with which it will come into contact are not excessive, and breakage of the yarn at the time of processing is unlikely to occur. Such excellent friction characteristics have heretofore been obtained only when a proper amount of titanium dioxide was added and has not been achievable by other methods.

When titanium dioxide was added, as mentioned above, this adversely affected the transparency and brilliancy of the yarn, and said friction coefficients have been unable to obtain while maintaining a solution haze of about 5–70%. In the present invention, a fiber having excellent friction characteristics is obtained, while maintaining a solution haze at about 5–70%.

A polyester fiber whose solution haze is within the range of 5–70% has an L value (measured by a color machine manufactured by Nippon Color Machine Co., Ltd.) within 30–60. However, when titanium dioxide is added, unless the added amount is so increased as to make the L value of the polyester fiber more than 60, adequate friction coefficients are not obtained. The value corresponds well to visually observed transparency and brilliancy. The lower the L value, the more excellent the transparency and brilliancy. However, when the L value is less than 30, the polyester fiber has a generally blackened appearance.

The effects attained in accordance with the present invention include the following:

1. The product has excellent transparency.
2. It is easy to produce; this has heretofore become a problem during melt-shaping and drawing processes.
3. It performs excellently in various subsequent processing steps, for example, texturizing, weaving, knitting, winding and cutting.
4. A highly oriented undrawn yarn may be obtained, having a birefringence value of $13 \times 10^{-3}$ to $80 \times 10^{-3}$. It may be obtained by high speed spinning of a polyester composition of the present invention. Yarn breakage does not occur, and an excellent wound package is obtained.
5. From this highly oriented undrawn yarn, drawn yarn and false twisted drawn yarn may be made, free from yarn breakage, nap, dye unevenness and dye flecks.
6. Clogging of filters, yarn breakage and film breakage seldom occur during melt-shaping processes.
7. The amount of a foreign substance adhered to the wall surface and to the heat transmitting surface of the apparatus for synthesizing the polyester is small. It is possible to continue the production of polyester under stable conditions for a long period of time.

Polyester compositions of the present invention are applicable not only as filaments and staple fibers, but also as non-oriented, uniaxially oriented and biaxially oriented films, as monofilaments and for plastics.

The present invention will be explained hereinafter in detail by reference to specific examples which are not intended to limit the scope of the claims. Measurement of such parameters as amount of particles, particle diameter, amount of antimony in the particles, solution haze, coefficient of interyarn friction, and friction coefficient between yarn and metal, are carried out by the following methods.

MEASUREMENT OF AMOUNT OF PARTICLES

The following method may be used for measuring the amount of particles to the total weight of the product. About 300 grams of a polyester composition is sampled. 2.7 kilograms of o-chlorophenol are added to this composition. While the resulting mixture is stirred, the temperature is elevated to 100°C, the mixture is allowed to stand for one hour to dissolve the polymer portion. However, if the polymer portion is highly crystallized it might not dissolve sufficiently under these conditions, in which case the polymer composition may be melted once and thereafter quenched and then so dissolved. Next, for removing insoluble substances (with the exception of foreign substances such as dust contained in the polymer, or reinforcing agents added to the polymer) the resulting solution is filtered through a G-3 glass filter, and the weight of the insoluble product is deducted from the weight of the sample.

A rotor RP 30 is provided on an ultra-centrifuge 40 P manufactured by Hitachi Limited of Japan, and 30 cc of the resulting solution is poured per cell. Thereafter, the rotor is rotated at 4500 rpm and after confirming that there is no abnormality in rotation, a vacuum is applied to the interior of the rotor, the speed is raised to 30,000 rpm and the particles are centrifuged at room temperatre. Centrifuging is complete after 40 minutes. Completion is confirmed, when necessary, by determining that the percentage light transmission of the solution after centrifuging at 375 m$\mu$ has become constant, and that this constant has a higher value than it did before centrifuging. After centrifuging, the supernatant liquid is decanted by inclination to obtain centrifuged particles. Because of the possibility that the polymer portion might be mixed with the centrifuged particles, due to insufficient centrifuging, o-chlorophenol is added at room temperature to the collected particles. After roughly uniformly suspending the particles, the resulting mixture is again subjected to centrifuging. It is necessary to repeat this operation until a melting peak corresponding to that of the polymer cannot be detected by scanning-type differential calorimetric analysis of the particles after they have been dried. Finally, the separated particles so obtained are dried in vacuo at 120° C for 16 hours and weighed.

METHOD OF MEASURING PARTICLE DIAMETER

The polyester composition is pressed between cover glasses on a hot plate heated to 290° C to form a thin sheet. The sheet is observed under a phase contrast microscope or a dark ground polarizing microscope.

METHOD OF EVALUATING THE AMOUNT OF ANTIMONY

A certain amount of particles obtained in accordance with the aforementioned separating method is wet decomposed in mixed sulfuric acid and perchloric acid and cooled. Water is added to the wet decomposed particles, which are estimated by atomic absorption spectroscopic analysis. The wave length used in the measurement is 2311 Angstrom.

METHOD OF MEASURING SOLUTION HAZE 5.4 grams of a polyester composition are dissolved in 40 cc of a tetrachloroethane/phenol (4/6) mixed solvent at 102° C with stirring for 2 hours, and thereafter cooled. This liquid is collected in a 10 mm cell made of quartz glass and the haze value is measured by an integrating sphere-type HTR meter SEP-H-2 (manufactured by Nippon Seimithu Kogaku Co., Ltd.).

METHOD OF MEASURING FILM HAZE

The haze of the film is measured in accordance with ASTM-D 1003.

METHOD OF MEASURING A COEFFICIENT OF INTERYARN FRICTION AND FRICTION COEFFICIENT BETWEEN YARN AND METAL

Figure 3:
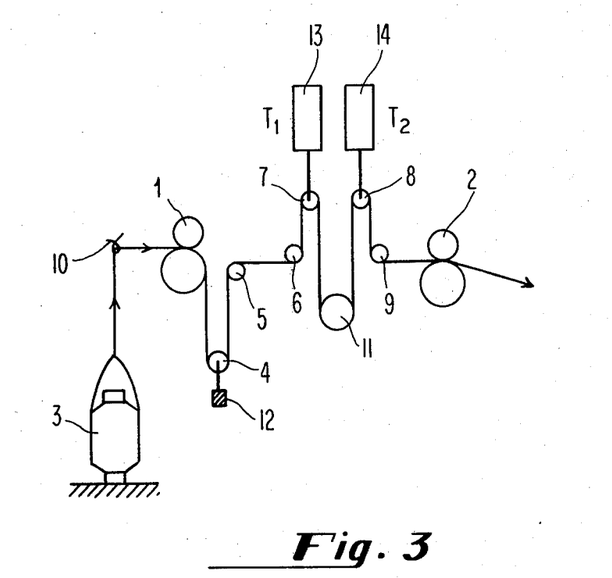
FIG. 3 shows an apparatus for measuring the coefficient of interyarn friction and the friction coefficient between yarn and metal.

Referring to FIG. 3, feed rolls 1 and take-up rolls 2 are provided. The number 3 designates a pirn of yarn to be measured. Rolls 4, 5, 6, 7, 8, 9 are rotary rollers, 10 is a guide and 11 is a friction member. On the roller 4, a proper load 12 is placed. The yarn to be measured is pulled off of pirn 3 and contacts the friction member 11 at $\pi$ rad angle via the guide 10, feed rollers 1 and rollers 4, 5, 6 and 7. The yarn passing through the friction member 11 is taken by the take-up rollers 2 via the rollers 8, 9.

The incoming and outgoing tensions $T_1$, $T_2$ of the friction member are measured by strain gages 13, 14.

The friction 4 between yarn and metal is measured by using a 4 mm diameter round rod having a chromium-plated surface as a friction member and the yarn to be measured is run at a speed of 55 m/min.

Figure 4:
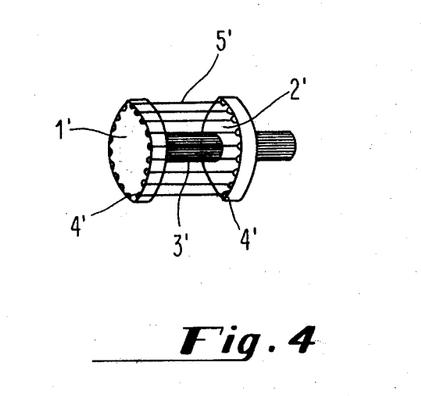
FIG. 4 shows a friction element used in such apparatus when the coefficient of interyarn friction is measured.

The coefficient of interyarn friction is measured by using a yarn, like the yarn to be measured as shown in FIG. 4, as a friction member and running the yarn to be measured at a speed of 300 m/min.

In FIG. 4, 1' and 2' are 34 mm diameter parallel discs and 3' is a fixed rod. The fixed rod 3' is perpendicular to the surface of discs 1' and 2'. On the peripheral surfaces of discs 1' and 2', there are 32 grooves 4 at regular intervals. Between the grooves of disc 1' and the grooves of disc 2', 32 yarns to be measured are so fixed as to be parallel to the fixed rod.

The friction coefficient of interyarn friction and the friction coefficient between yarn and metal are calculated from the following equation.

$$(T_2/T_1) = \exp(\mu \cdot \theta)$$

wherein $T_1$ is the incoming tension of the friction member, $T_2$ is the outgoing tension of the friction member, $\theta$ is a constant angle (rad). In the case of this measurement $\theta$ is $\pi$, and $\mu$ is the friction coefficient sought.

The following examples are illustrative of the invention:

EXAMPLE 1

100 parts of dimethyl terephthalate and 70 parts of ethylene glycol were subjected to an ester interchange reaction in the presence of 0.09 part of manganese acetate as a catalyst, by known methods. To the product was added 3 parts of terephthalic acid. To the resulting mixture were added, at 230° C with stirring at 50 rpm, an ethylene glycol solution of antimony trioxide having a concentration of 1000 grams per 150 liters, and an ethylene glycol solution of phosphoric acid having a concentration of 1000 g/50 liters (in such amounts that antimony trioxide was present in an amount of 0.07% by weight based on the polymer, and phosphoric acid was present in an amount of 0.05% by weight based on the polymer) simultaneously from separate inlets in 1 minute. Thereafter, 0.03 part of trimethyl phosphate was added to the mixture and the entirety was polymerized to obtain a polymer having an intrinsic viscosity (measured at 25° C in o-chlorophenol as a solvent) of 0.64. Said ethylene glycol solution of antimony trioxide was obtained by adding 1000 g of antimony trioxide to 150 liters of ethylene glycol and dissolving with heating at 130° C for 2 hours.

The resulting polymer was pressed on a hot plate heated to 290° C between cover glasses and made into a thin sheet. When this sample was observed under a phase contrast microscope, uniform particles having a particle diameter of about 1.0 micron were recognized and there were no coarse particles having a particle diameter of more than 10 microns. The solution haze of this polymer was 36.2%.

When the amount of the particles in this polymer was measured by the method heretofore described in detail, it was found to be 0.075% by weight of the polymer. The antimony content in the particles was 49.1%. The phosphorus content was 13.3%, and the result of an infrared spectroscopic analysis was similar to that of a salt of phosphoric acid and antimony prepared separately for this purpose.

When the polymer containing particles having an intrinsic viscosity of 0.64 was spun at 290° C from a spinneret having 12 holes at a discharge rate of 30 g/min to measure the maximum take-up speed of the undrawn yarn, the undrawn yarn could be taken up without breakage up to a take-up speed of 6000 m/min.

When the same polymer was spun at 285° C from a T-shaped spinneret having 36 holes at a discharge rate of 20.0 g/min and taken up at a rate of 1080 m/min, and when the resulting undrawn yarn was drawn to a ratio of 3.5 using a hot pin at 100° C to obtain 100 pirns each containing 2 kg of the drawn yarn having a T-shaped cross-section, there was no pirn in which any single filament broke.

The friction coefficient between yarn and metal of said drawn yarn was 0.65 and the coefficient of interyarn friction was 0.37. When the color of the drawn yarn was measured by a color machine manufactured by Nippon Color Machine Co., Ltd., it had an L value of 44.1, a (b) value of −4.0 and an (a) value of −0.8, and it had excellent transparency and brilliancy. (The L value corresponds well to the visually observed transparency and brilliancy; the lower the L value, the more excellent the transparency and brilliancy.)

The description of the meaning of (a) and (b) values:
(b) value
(b) value is the number which indicates the color position on the blue-yellow complementary color axis.
+ value of (b) represents yellowish color and − value of (b) represents blueish color.
The absolute number of (b) represents the strength of yellowness or blueness.
(a) value
(a) value is the number which indicates the color position on the green-red complementary color axis.
+ value of (a) represents red color and − value of (a) represents greenish color.
The absolute number of (a) represents the strength of red or greeness.

Figure 1:
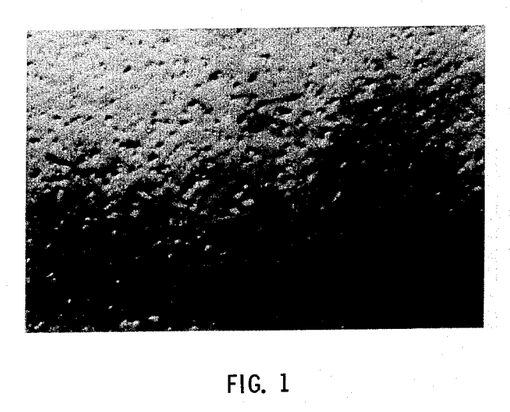
FIG. 1 is a photograph on the surface of a biaxially oriented film obtained from a polyester composition of the present invention.

On the other hand, the polyester obtained in this example was made into a 25 $\mu$ thick film under ordinary conditions for making a biaxially oriented film (draw ratio 3.3 times in a longitudinal direction and 3.4 times in a transverse direction, heat treatment at 215° C for 13 seconds), which film was wound into a 3000 meter roll, which roll was cut into a 2-cm wide, narrow film by the knife edge method. The resulting film had a static friction coefficient among films of 0.81, a haze of 0.50%, was very excellent in transparency, and had a maximum degree of surface roughness of 0.2 $\mu$. The surface condition of this film was as shown in FIG. 1.

The original roll and the narrow film both had a very excellent wound shape. Especially on the cut surface of the roll of the narrow film, no heaping of film was observed.

EXAMPLE 2

Pellets of the polyester containing particles obtained in Example 1 were melted at 290° C, extruded from a spinneret having 36 orifices each having a diameter of 0.3 mm at a rate of 44.6 g/min, cooled and a finishing oiling agent was applied. It was thereafter taken up at a rate of 2500 m/min in an attempt to obtain 250 drums each containing 3 kg of undrawn filaments. Winding was carried out by a rotary traverse friction drive-type winder. When a bundle of filaments transferring in a rotary traverse groove while running was observed with the use of a stroboscopic lamp, the filaments were always well bundled. The wound up packages were beautiful, with no falling down of filament bundles at either of the end surfaces of the package and, after all, the number of unfilled drums in which filaments were broken before completion of 3 kg winding was only 2. The birefringence value of this undrawn yarn was 22 × $10^{-3}$. Said undrawn filaments had a color value L of 45.0, a (b) value of −2.3 and an (a) value of −0.3.

The undrawn filaments were drawn 2.23 times at a rate of 400 m/min using a hot roller at 90°C, twisted and wound up as a 3 kg pirn. During the drawing, 10 single filaments broke and the number of pirns containing no filament breakage was 238. Said drawn yarn had a coefficient of interyarn friction of 0.38, a friction coefficient between yarn and metal of 0.68 and a color value L of 46.0, a (b) balue of −4.3 and an (a) value of −0.5. When said drawn yarn was false twisted by using a hot plate at 210°C at a yarn speed of 100 m/min and at 350,000 rpm, the number of naps counted on the surface of a 1 kg winding cheese, was 1.9 naps/cheese.

EXAMPLE 3

100 parts of terephthalic acid and 45 parts of ethylene glycol were subjected to an esterification reaction in the presence of 0.03 part of triethanolamine as an agent for preventing lowering of the softening point at 240°C under a pressure of 2 kg/cm² to obtain a product having a conversion of esterification reaction of 91.0%.

To this reaction product, an ethylene glycol solution of antimony trioxide having a concentration of 100 g/150 liters and an ethylene glycol solution of phosphoric acid having a concentration of 1000 g/50 liters were added at 235°C with stirring at 48 rpm in such amounts that the content of antimony trioxide became 0.075% by weight of the polymer and the content of phosphoric acid became 0.045% by weight of the polymer. The method involved adding an ethylene glycol solution of antimony in 30 seconds. Immediately thereafter, an ethylene glycol solution of phosphoric acid was added in 20 seconds from the same inlet port, and thereafter the resulting mixture was polymerized by known methods to obtain a polymer having an intrinsic viscosity of 0.65.

The method of preparing the ethylene glycol solution of antimony trioxide was the same as that in Example 1. When the resulting polymer was observed under a phase contrast microscope the same as in Example 1, uniform particles having a particle diameter of about 1.0 micron were observed, and no coarse particles having a particle diameter of more than 10 microns were observed at all. The solution haze of this polymer was 38.6%. The amount of the particle in the polymer was 0.080% by weight and the content of antimony in the particles was 50.5% by weight of the particles. The amount of phosphorus was 13.5% by weight.

When the maximum yarn take-up speed of polyester containing said particles obtained in this example was measured by a method the same as that in Example 1, the undrawn yarn could be taken up without breakage up to 6200 m/min. When by a method the same as that in Example 1, the polymer was melt-spun, and the undrawn yarn was drawn so as to obtain 500 pirns each containing 2 kg of the drawn yarn having a T-shaped cross-section, there was no pirn in which breakage of the whole 36 filaments occurred and a single filament broke in only five pirns. Said drawn yarn had a friction coefficient between yarn and metal of 0.62 and a coefficient of interyarn friction of 0.38, and a measured color value L of 43.5, a (b) value of −5.1 and an (a) value of −0.5. The yarn had a very excellent transparency and brilliancy.

COMPARATIVE EXAMPLE 1

100 parts of dimethyl terephthalate and 70 parts of ethylene glycol were subjected to, by conventional methods, an ester interchange reaction in the presence of 0.11 part of calcium acetate as a catalyst. To the product were added 0.015 part of phosphorous acid and 0.027 part of antimony trioxide and the resulting mixture was polymerized by conventional methods to obtain a polymer having an intrinsic viscosity of 0.64.

When the resulting polymer was observed under a phase contrast microscope the same as in Example 1, there were non-uniform particles having particle diameters of 1–20 microns, many particles having particle diameters exceeding 20 microns, and sometimes particles having particle diameters exceeding 30 microns.

The solution haze of this polymer was 58.8%. The amount of the particle in the polymer was 0.075% by weight of the polymer, and the metal component in said particles was 5.1% by weight of antimony and 14.0% by weight of calcium (based on the particles). When the maximum yarn take-up speed without yarn breakage was measured by the method of Example 1, it was found to be 4600 m/min.

When by a method the same as that in Example 1 the resulting polymer was spun and drawn so as to obtain 100 pirns each containing 2 kg of the yarn having a T-shaped cross-section, the number of pirns in which breakage of the whole 36 filaments occurred was three, and the number of pirns in which a single filament broke was 11.

The drawn yarn had a friction coefficient between yarn and metal of 0.70, a coefficient of interyarn friction of 0.30 and a color value L of 52.0, a (b) value of −3.1 and an (a) value of 0.9, which meant that said drawn yarn had tentatively satisfactory transparency and brilliancy.

Polyester obtained in this comparative example was made into a biaxially oriented film, a roll and a cut narrow film the same as in Example 1. The static friction coefficient among films of the resulting film was 0.85 and the haze of said film was 4.21. This meant that said film maintained tentative transparency. However, the maximum degree of surface roughness was 0.6µ, meaning that the surface of said film was very rough.

Figure 2:
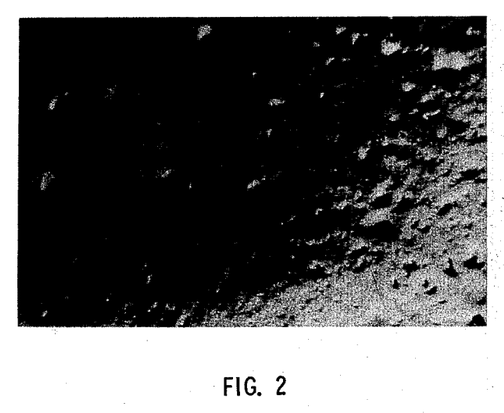
FIG. 2 is a photograph of the surface of a biaxially oriented film obtained from a conventional polyester composition added with calcium acetate and containing particles including elemental calcium.

The surface condition of said film was as shown in FIG. 2.

The wound shape of the roll was loose; on the cut surface of a roll of the narrow film, heaping of the film was recognized and observed.

COMPARATIVE EXAMPLE 2

100 parts of dimethyl terephthalate and 70 parts of ethylene glycol were subjected to an ester interchange reaction by conventional methods in the presence of 0.09 part of manganese acetate as a catalyst. To the resulting reaction product were added 0.03 parts of trimethyl phosphate and 0.03 parts of antimony trioxide, and the resulting mixture was polymerized by known methods to obtain a polymer having an intrinsic viscosity of 0.65.

When the resulting polymer was observed under a phase contrast microscope, particles were almost not observable. The solution haze of this polymer was 1.6%.

The amount of particles in this polymer was 0.001% by weight of the polymer.

When the maximum yarn take-up speed of said polymer was measured by a method the same as that in Example 1, the maximum speed at which the yarn could be taken up without yarn breakage was 4300 m/min.

When by a method the same as that in Example 1 said polymer was melt-spun and drawn so as to obtain 100 pirns each containing a 2 kg of the yarn having a T-shaped cross-section, the number of pirns in which breakage of the whole 36 filaments occurred was five, and the number of pirns in which a single filament broke was 15. In the wound up drawn yarn, many sections or areas were found to have slackened.

The drawn yarn had a friction coefficient between yarn and metal of 1.23, a coefficient of interyarn friction of 0.55 and a measured color value L of 40.1, a (b) value of −3.5 and an (a) value of −1.1. Accordingly, the resulting drawn yarn had transparency and brilliancy, however, its friction characteristics were very poor.

A polyester of this comparative example was made into a biaxially oriented film the same way as in Example 1, and was formed into a roll in an attempt to obtain a cut film. However, winding into a roll was impossible because of the high friction coefficients.

COMPARATIVE EXAMPLE 3

Referring to Comparative Example 2, 0.2 part of titanium dioxide was further added to the product of the ester interchange reaction.

When the resulting polymer was observed under a dark ground polarizing microscope, many particles whose particle diameters were 1.0 micron or less were observed, and coarse particles whose particle diameters exceeded 10 microns were very rarely observed. The solution haze of this polymer was 92.6%.

The amount of particles in this polymer was 0.19% by weight of the polymer and the added titanium dioxide was separated per se.

When the maximum yarn take-up speed of said polymer was measured by a method the same as that in Example 1, the maximum speed at which the yarn could be taken up without yarn breakage was 4800 m/min.

When by a method the same as that in Example 1 said polymer was melt-spun and drawn so as to obtain 100 pirns each containing 2 kg of the yarn having a T-shaped cross-section, the number of pirns in which breakage of the whole 36 filaments occurred was one and the number of pirns in which a single filament broke was three.

This drawn yarn had a friction coefficient between yarn and metal of 0.73, a coefficient of interyarn friction of 0.45 and a measured color value L of 73.5, a (b) value of −3.1 and an (a) value of −1.0. Accordingly, the drawn yarn was tentatively satisfactory in friction characteristics, but was insufficient in transparency and brilliancy and was very low in commercial value.

Polyester obtained in this comparative example was made into a biaxially oriented film and thereafter wound up as a roll, which was cut into a narrow film the same as in Example 1.

The static friction coefficient among films of said film was 0.90 and the haze of said film was 21.1%. The film as tentatively satisfactory as to friction coefficient, but it had no commercial value as a transparent film.

COMPARATIVE EXAMPLE 4

Pellets of polyesters obtained in accordance with Comparative Examples 1, 2 and 3 were melt-spun and drawn in the same way as in Example 2. The results were as shown in Table 1.

Table 1

| Pellets | | CE 1 | CE 2 | CE 3 |
|---|---|---|---|---|
| Number of unfilled drums | | 32 | 37 | 16 |
| Number of pirns containing no filament breakage | | 131 | 160 | 212 |
| Number of naps (naps/cheese) | | 18 | many | 12 |
| Drawn yarn | Coefficient of interyarn friction | 0.28 | 0.60 | 0.42 |
| | Friction coefficient between yarn and metal | 0.69 | 1.31 | 0.68 |

EXAMPLE 4

100 parts of dimethyl terephthalate and 70 parts of ethylene glycol were subjected to an ester interchange reaction by known methods in the presence of 0.07 part of manganese acetate as a catalyst. To the reaction product were added an ethylene glycol slurry of antimony trioxide having a concentration of 2000 g/150 liters and an ethylene glycol solution of phosphoric acid having a concentration of 2000 g60 liters at 230° C with stirring at 60 rpm in such amounts that 0.12% by weight based on the polymer of antimony trioxide was contained in the polymer and 0.15% by weight (based on the polymer) of phosphoric acid was contained in the polymer by adding antimony trioxide first and then continuously adding phosphoric acid after 1 minute; thereafter the resulting mixture was polymerized by known methods to obtain a polymer having an intrinsic viscosity of 0.65.

The resulting polymer was pressed between cover glasses on a hot plate heated to 290° C to make a thin sheet. When this sample was observed under a phase contrast microscope, uniform particles having a particle diameter of about 2 microns were observed and there were no coarse particles having a particle diameter of more than 10 microns.

The solution haze of this polymer was 48.3%. The amount of the particles of the resulting polymer was 0.132% by weight of the polymer, and the particles contained 38.6% of antimony and 13.3% of phosphorus. When the maximum take-up speed of the yarn of the resulting polymer was measured by a method the same as in Example 1, the maximum speed at which the yarn could be taken up without yarn breakage was 6000 m/min.

When the polymer was melt-spun and drawn in an attempt to obtain 100 pirns each containing 2 kg of the yarn having a T-shaped cross-section, by a method the same as that in Example 1, there was no pirn in which breakage of the whole 36 filaments took place and there was only one pirn in which breakage of a single filament took place. The drawn yarn had a friction coefficient between yarn and metal of 0.62, a coefficient of interyarn friction of 0.38 and a measured color value L of 47.0, a (b) value of −2.0 and an (a) value of −0.3, and it had excellent transparency. Various values and friction coefficients obtained by carrying out the same operations as in Example 2 were as follows.

| | | |
|---|---|---|
| Number of unfilled drums | | 2 |
| Number of pirns containing no filament breakage | | 245 |
| Number of naps on the surface of a cheese | | 1.5 naps/cheese |
| Drawn yarn | Coefficient of interyarn friction | 0.39 |
| | Friction coefficient between yarn and metal | 0.61 |

EXAMPLE 5

To a first esterification reactor placed under a pressure of 1 kg/cm² and heated to 230° C, terephthalic acid and ethylene glycol were continuously supplied at a rate of 45 kg/hr and 22 kg/hr, respectively. The reaction product of the first esterification reactor was continuously taken out and supplied to a second esterification reactor also maintained under a pressure of 1.0 kg/cm² and heated to 230° C.

One-half of the reaction product of the second esterification reactor was circulated to the first esterification reactor and the other half of the reaction product was continuously supplied to a reservoir under atmospheric pressure, heated to 240° C and stirred at 50 rpm. Into this reservoir, an ethylene glycol solution of antimony trioxide having a concentration of 1000 g/150 liters was added at a rate of 5.5 liters/hr and an ethylene glycol solution of phosphoric acid having a concentration of 1000 g/150 liters was added at a rate of 3.3 liters/hr through different inlet ports.

At this time, the conversion of the esterification reaction in this reservoir was 93.0%. The reservoir had mixing characteristics which could be handled as a complete mixing vessel, and the average residence time of the reactants in this reservoir was 1 hour and 10 minutes. The reaction product taken out of the reservoir was polycondensed in a preliminary polycondensation reactor and a final polycondensation reactor at 280°–285° C under a vacuum of 10–0.5 mm Hg and a continuously taken out as a polymer having an intrinsic viscosity of 0.65.

In this apparatus, the reservoir into which antimony trioxide and phosphoric acid were added was heated by a steam coil inserted therein. In this operation, when the characteristics of a polymer were obtained and the pressure of steam introduced into the steam coil in the reservoir were tabulated on a monthly basis up to 6 months after the operation was started. They are shown in Table 2.

For purposes of comparison, the polymer characteristics and steam pressure are shown as comparative examples when the substance added into the reservoir was (1) an ethylene glycol solution of antimony trioxide having a concentration of 1000 g/150 liters, added at a rate of 2.2 liters/hr, (2) an ethylene glycol solution of calcium acetate having a concentration of 1000 g/150 liters added at a rate of 6.6 liters/hr, and (3) an ethylene glycol solution of phosphoric acid having a concentration of 1000 g/150 liters added at a rate of 1.5 liters/hr.

Table 2

|  |  |  | At first | After 1 month | After 2 months | After 3 months | After 4 months | After 5 months | After 6 months |
|---|---|---|---|---|---|---|---|---|---|
| This Example | | Steam pressure (kg/cm$^2$) | 38 | 38 | 38 | 38 | 38 | 38 | 38 |
| | Polymer Characteristics | Amount of particles (wt %) | 0.075 | 0.075 | 0.073 | 0.076 | 0.075 | 0.074 | 0.076 |
| | | Sb in the particles (wt %) | 48.0 | 49.1 | 48.5 | 50.1 | 49.5 | 49.1 | 48.6 |
| | | Ca in the particles (wt %) | 0 | 0 | 0 | 0 | 0 | 0 | 0 |
| | | Foreign substance in the polymer (number/100 g) | 3 | 2 | 2 | 1 | 2 | 2 | 2 |
| | DGPM observation | Average particle diameter ($\mu$) | 0.5 | 0.5 | 0.5 | 0.5 | 0.5 | 0.5 | 0.5 |
| | | Maximum particle diameter ($\mu$) | 4.5 | 4.0 | 4.0 | 4.5 | 4.0 | 4.5 | 4.0 |
| Comparative Example | | Steam pressure (kg/cm$^2$) | 38 | 38 | 40 | 43 | 47 | 51 | 55 |
| | Polymer Characteristics | Amount of particles (wt %) | 0.073 | 0.061 | 0.065 | 0.076 | 0.073 | 0.063 | 0.078 |
| | | Sb in the particles (wt %) | 7.2 | 6.3 | 7.3 | 7.1 | 8.1 | 7.1 | 7.3 |
| | | Ca in the particles (wt %) | 13.2 | 14.8 | 13.8 | 14.2 | 14.3 | 13.5 | 13.8 |
| | | Foreign substance in the polymer (number 100/g) | 3 | 20 | 20 | 40 | 80 | 100 | 130 |
| | DGPM observation | Average particle diameter ($\mu$) | 1.5 | 2.0 | 1.5 | 2.5 | 1.5 | 2.5 | 2.0 |
| | | Maximum particle diameter ($\mu$) | 12.5 | 15.0 | 18.0 | 15.0 | 18.0 | 19.0 | 18.0 |

NOTES:
(a) DGPM means dark ground polarizing microscope
(b) The designation "foreign substance in the polymer" shows the number of foreign substances in 100 g of the polymer recognizable by the naked eye.

EXAMPLE 6

Example 3 was repeated except for changing the added amounts of antimony trioxide and phosphoric acid. The added amounts and the results obtained are shown in Table 3.

Table 3

| Sample No. | | | 1 | 2 | 3 | 4 | 5 |
|---|---|---|---|---|---|---|---|
| Added amount of antimony trioxide (wt % based on the polymer) | | | 0.04 | 0.04 | 0.09 | 0.70 | 1.0 |
| Added amount of phosphoric acid (wt % based on the polymer) | | | 0.007 | 0.015 | 0.06 | 0.60 | 0.9 |
| Amount of particles (wt % based on the polymer | | | 0.01 | 0.02 | 0.1 | 1.0 | 1.5 |
| Polymer characteristics | DGPM observation | Average particle diameter ($\mu$) | 0.6 | 0.6 | 0.6 | 0.7 | 1.5 |
| | | Maximum particle diameter ($\mu$) | 4.0 | 4.5 | 4.5 | 4.5 | 10.0 |
| Solution haze (%) | | | 4.5 | 8.9 | 32.5 | 68.6 | 82.3 |
| Spinning test | Maximum take-up speed (m/min) | | 4900 | 6000 | 6200 | 5980 | 4700 |
| Drawing test | Number of pirns in which all 36 filaments broke (number/500) | | 4 | 1 | 1 | 2 | 3 |
| | Number of pirns in which a single filament broke (number/500) | | 11 | 5 | 4 | 6 | 13 |
| Drawn yarn characteristics | Friction coefficient between yarn and metal | | 1.12 | 0.80 | 0.61 | 0.50 | 0.48 |
| | Coefficient of interyarn friction | | 0.52 | 0.45 | 0.38 | 0.33 | 0.25 |
| | Color L | | 39.2 | 40.3 | 41.5 | 51.0 | 63.5 |
| | b | | −3.8 | −3.5 | −3.8 | −4.0 | −3.9 |
| | a | | −0.8 | −1.0 | −0.9 | −1.0 | −1.0 |
| | Transparency, brillancy | | good | good | good | good | not good |

Table 3-continued

| Sample No. | 1 | 2 | 3 | 4 | 5 |
| --- | --- | --- | --- | --- | --- |

Samples Nos. 1 and 5 were comparative examples for clarifying the effect of the present invention.

EXAMPLE 7

Example 3 was repeated except for adding the necessary amount of calcium acetate into said ethylene glycol solution of antimony trioxide to thereby change the added amounts of antimony trioxide, calcium acetate and phosphoric acid. The results are tabulated in Table 4.

EXAMPLE 8

Example 3 was repeated except for changing the kind of antimony compound and the kind of inorganic acid or derivative thereof. The amount of antimony compound was so adjusted that the equivalent of the antimony atom was the same as that of Example 3. The amount of inorganic acid or derivative thereof was so adjusted that the equivalent ratio thereof was the same as that in Example 3. The results are shown in Table 5.

Table 4

| | Sample No. | | 1 | 2 | 3 | 4 | 5 |
| --- | --- | --- | --- | --- | --- | --- | --- |
| Added substance and added amount (wt % based on the polymer) | $Sb_2O_3$ | | 0.03 | 0.05 | 0.05 | 0.07 | 0.07 |
| | $Ca(OAc)_2 \cdot H_2O$ | | 0.09 | 0.05 | 0.08 | 0.05 | 0.05 |
| | $H_3PO_4$ | | 0.02 | 0.05 | 0.01 | 0.06 | 0.03 |
| Separate Particles | Amount of particles (wt % based on the polymer) | | 0.073 | 0.051 | 0.060 | 0.081 | 0.041 |
| | Particle composition (wt% based on the polymer) | C | 31.8 | 12.3 | 20.4 | 9.8 | 8.8 |
| | | H | 2.20 | 1.30 | 1.71 | 1.10 | 0.98 |
| | | Sb | 7.3 | 21.5 | 5.0 | 31.6 | 20.3 |
| | | P | 6.1 | 10.2 | 3.5 | 12.3 | 8.1 |
| | | Ca | 13.2 | 6.3 | 8.6 | 4.8 | 4.0 |
| Polymer characteristics | DGPM observation | Average particle diameter ($\mu$) | 2.0 | 0.7 | 2.5 | 0.6 | 0.8 |
| | | Maximum particle diameter ($\mu$) | 16.0 | 5.5 | 20.0 | 4.5 | 5.0 |
| Spinning test | Maximum take-up speed (m/min) | | 2600 | 3900 | 2200 | 4300 | 3800 |
| Drawing test | Number of pirns in which all 36 filaments broke (number/500) | | 10 | 3 | 21 | 2 | 4 |
| | Number of pirns in which a single filament broke (number/500) | | 81 | 15 | 118 | 8 | 12 |
| Drawn yarn characteristics | Friction coefficient between yarn and metal | | 0.69 | 0.73 | 0.70 | 0.62 | 0.78 |
| | Color | L | 51.0 | 40.5 | 53.0 | 44.1 | 38.9 |
| | | a | −0.8 | −0.7 | −0.7 | −1.0 | −0.8 |
| | | b | −3.9 | −4.0 | −4.1 | −3.8 | −3.9 |
| | Transparency, brilliancy | | good | good | good | good | good |

Samples Nos. 1 and 3 in Table 4 were comparative examples for clarifying the effect of the present invention.

Table 5

| | | Triphenyl antimonate | Antimony acetate | Antimony pentaoxide | Antimony trioxide |
| --- | --- | --- | --- | --- | --- |
| Antimony compound | | | | | |
| Phosphorus compound (or $H_2SO_4$) | | Phosphoric acid | Phosphorous acid | Trimethyl phosphate | Sulfuric acid |
| Amount of particles (wt %) | | 0.082 | 0.085 | 0.050 | 0.035 |
| Amount of Sb in the particle (wt % based on the particles) | SB | 52.8 | 53.5 | 52.1 | 45.2 |
| DGPM observation | Average particle diameter ($\mu$) | 0.6 | 0.5 | 0.5 | 0.5 |
| | Maximum particle diameter ($\mu$) | 5.0 | 4.5 | 4.5 | 4.5 |
| Spinning | Maximum take-up | | | | |

Table 5-continued

| Antimony compound | | Triphenyl antimonate | Antimony acetate | Antimony pentaoxide | Antimony trioxide |
|---|---|---|---|---|---|
| Phosphorus compound (or $H_2SO_4$) | | Phosphoric acid | Phosphorous acid | Trimethyl phosphate | Sulfuric acid |
| Amount of particles (wt %) | | 0.082 | 0.085 | 0.050 | 0.035 |
| test speed (m/min) | | 6100 | 6000 | 5900 | 5100 |
| Drawing test | Number of pirns in which all 36 filaments broke (number/500) | 3 | 4 | 3 | 3 |
| | Number of pirns in which a single filament broke (number/500) | 8 | 11 | 13 | 14 |
| Drawn yarn characteristics | Friction coefficient between yarn and metal | 0.58 | 0.57 | 0.55 | 0.60 |
| | Color    L | 46.9 | 44.1 | 42.1 | 44.1 |
| | b | −4.0 | −3.0 | −2.5 | −2.5 |
| | a | −0.9 | −1.0 | −1.5 | −1.0 |
| | Transparency, brilliancy | good | good | good | good |

EXAMPLE 9

100 parts of 2,6-naphthalene dicarboxylic acid methyl ester and 50 parts of ethylene glycol were subjected to an ester interchange reaction in the presence of 0.07 part of manganese chloride as a catalyst. To the reaction product were added, the same as in Example 1, terephthalic acid, antimony trioxide, phosphoric acid and trimethyl phosphate. The resulting mixture was polymerized by known methods to obtain a polymer having an intrinsic viscosity of 0.64. When this polymer was observed under a dark ground polarizing microscope, many fine particles having a particle diameter of about 0.5 micron were observed and there was no coarse particle whose particle diameter exceeded 5 microns.

The amount of the particles was 0.075% by weight of the polymer and the antimony content in said particles was 54.2%.

EXAMPLE 10

100 parts of dimethyl terephthalate and 145 parts of 1,4-cyclohexane dimethanol (containing 72% of the transisomer) were subjected to an ester interchange reaction by known methods in the presence of 0.015 part of $NaHTi(OC_4H_9)_6$ made into a butanol solution as an ester interchange catalyst and a polymerization catalyst.

After completion of the ester interchange reaction, antimony trioxide and phosphoric acid were added to the reaction product the same as in Example 4. The resulting mixture was polymerized by known methods to obtain a polymer having an intrinsic viscosity of 0.71.

When this polymer was observed under a dark ground polarizing microscope, many fine particles having a particle diameter of about 0.5 micron were observed and there was no coarse particle whose particle diameter exceeded 5 microns.

The amount of the particles was 0.07% by weight based on the polymer and the antimony content in said particles was 53.3%.

EXAMPLE 11

100 parts of terephthalic acid and 95 parts of 1,4-butane diol were subjected to an esterification reaction to obtain a product having a conversion of esterification of 92.1%. To this product, antimony trioxide and phosphoric acid were added the same as in Example 2 and the resulting mixture was polymerized by known methods to obtain a polymer having an intrinsic viscosity of 0.64.

When this polymer was observed under a dark ground polarizing microscope, uniform particles having a particle diameter of about 0.5 micron were observed and there was no coarse particle whose particle diameter exceeded 5 microns.

The amount of the particles was 0.075% by weight, based on the polymer, and the antimony content in said particles was 48.9%.

The following is claimed:

1. A fiber- and film-forming composition comprising a linear synthetic polyester containing a multiplicity of spaced-apart particles containing antimony, said particles being present in an amount of from about 0.02 to 1.0% by weight of said composition, the content of antimony in said particles being from about 15 to 70% based upon the weight of said particles, the average diameter of said particles being less than 10 microns and the maximum diameter of said particles being less than 30 microns, and the solution haze of said composition being from about 5 to 70%.

2. The fiber- and film-forming composition of claim 1, wherein said antimony-containing particles include an antimony salt of an inorganic acid.

3. The fiber- and film-forming composition of claim 2, wherein said antimony salt is antimony phosphate.

4. The fiber- and film-forming composition of claim 1, wherein said amount is from 0.05 to 0.5% by weight and said content is from 30 to 60% by weight.

5. A fiber- and film-forming composition of claim 1, wherein the acid component of said linear synthetic polyester comprises at least one member selected from the group consisting of terephthalic acid and 2,6-naphthalene dicarboxylic acid.

6. A fiber- and film-forming composition of claim 1, wherein the glycol component of said linear synthetic polyester comprises at least one member selected from the group consisting of ethylene glycol, 1,4-butanediol and 1,4-cyclohexane dimethanol.

7. A fiber- and film-forming composition of claim 1, wherein said linear synthetic polyester is poly (ethylene terephthalate).

8. A filament consisting of the composition of claim 1.

9. A filament of claim 8 having a birefringence of from 0.013 to 0.080.

10. A filament of claim 8 having a non-circular cross-section.

11. A film consisting of the composition of claim 1.

12. A film of claim 11, wherein said film is biaxially oriented.

13. A method of producing a fiber- and film-forming composition of claim 1 which comprises
   a. esterifying at least one kind of dicarboxylic acid with at least one kind of glycol,
   b. adding at least one kind of antimony compound in an amount calculated as elemental antimony of from about 0.03 to 0.6% by weight of said composition at the time when the esterification of said dicarboxylic acid has proceeded and is from 85 to 95% complete,
   c. adding at least one kind of inorganic acid and/or derivative thereof in an amount of from about 0.5 to 2.0 equivalent of said antimony compound within 0–10 minutes after the addition of said antimony compound, and
   d. completing the esterification and subsequent polymerization.

14. A method of claim 13, wherein said inorganic acid and/or derivative thereof is selected from the group consisting of phosphoric acid, phosphorous acid and esters thereof.

15. A method of claim 13, wherein said antimony compound is selected from the group consisting of antimony trioxide, antimony pentoxide, antimony acetate and antimony glycolate.

16. A method of producing a fiber- and film-forming composition of claim 1 which comprises
   a. transesterifying at least one kind of lower alkyl ester of dicarboxylic acids with at least one kind of glycol,
   b. adding at least one kind of antimony compound in an amount calculated as elemental antimony of from about 0.03 to 0.6% by weight of said composition,
   c. adding at least one kind of inorganic acid and/or derivative thereof in an amount of from 1.5 to 3.0 equivalents of said antimony compound within 0–10 minutes after the addition of said antimony compound, and
   d. completing the polymerization.

17. A method of claim 16, wherein said inorganic acid and/or derivative thereof is selected from the group consisting of phosphoric acid, phosphorous acid and esters thereof.

18. A method of claim 16, wherein said antimony compound is selected from the group consisting of antimony trioxide, antimony pentoxide, antimony acetate and antimony glycolate.

19. A method of producing a fiber- and film-forming composition of claim 1 which comprises
   a. transesterifying at least one kind of lower alkyl ester of dicarboxylic acids with at least one kind of glycol,
   b. adding at least one kind of organic acid,
   c. adding at least one kind of antimony compound in an amount calculated as elemental antimony of from about 0.03 to 0.6% by weight of said composition within 10 minutes of the time of addition of said organic acid,
   d. adding at least one kind of inorganic acid and/or derivative thereof in an amount of from about 0.5 to 2.0 equivalents of said antimony compound within 0–10 minutes after the addition of said antimony compound, and
   e. completing the polymerization.

20. A method of claim 19, wherein said inorganic acid and/or derivative thereof is selected from the group consisting of phosphoric acid, phosphorous acid and esters thereof.

21. A method of claim 19, wherein said antimony compound is selected from the group consisting of antimony trioxide, antimony pentoxide, antimony acetate and antimony glycolate.

22. An improved multifilament yarn, composed of a linear synthetic polyester containing a multiplicity of spaced-apart fine particles containing antimony, said yarn having a solution haze of from about 5 to 70%, a coefficient of interyarn friction of from about 0.32 to 0.50 and a friction coefficient between yarn and metal of from about 0.45 to 0.80, wherein said fine particles are present in an amount of from about 0.02 to 1.0% by weight of said yarn, the average diameter of said fine particles being less than about 10 microns and the maximum diameter of said fine particles being substantially less than about 30 microns.

23. An improved multifilament yarn of claim 22, wherein said amount of said particles which contain antimony is from about 0.05 to 0.5% by weight, said solution haze is from about 20 to 60%, said coefficient of interyarn friction is from about 0.35 to 0.45 and said friction coefficient between yarn and metal is from about 0.45 to 0.70.

* * * * *